(No Model.) 5 Sheets—Sheet 1.
J. C. HENDERSON.
HEAT ECONOMIZER.
No. 604,046. Patented May 17, 1898.
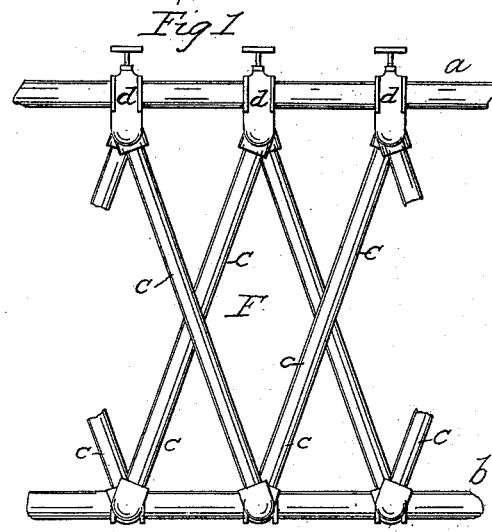
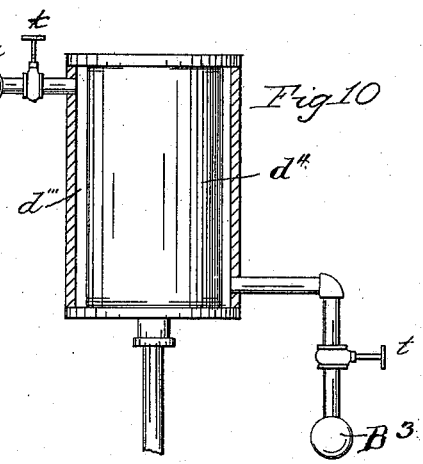
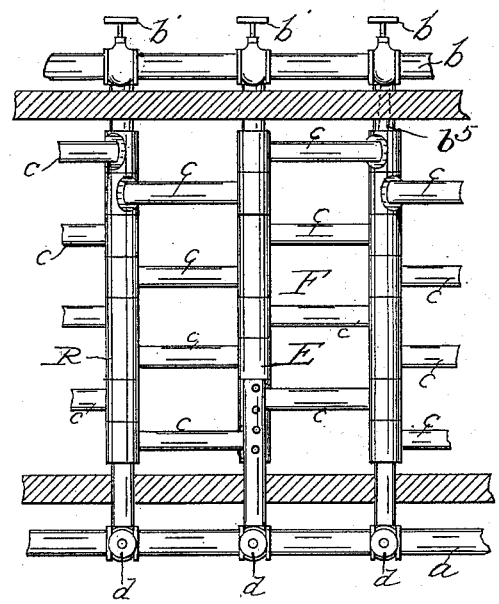
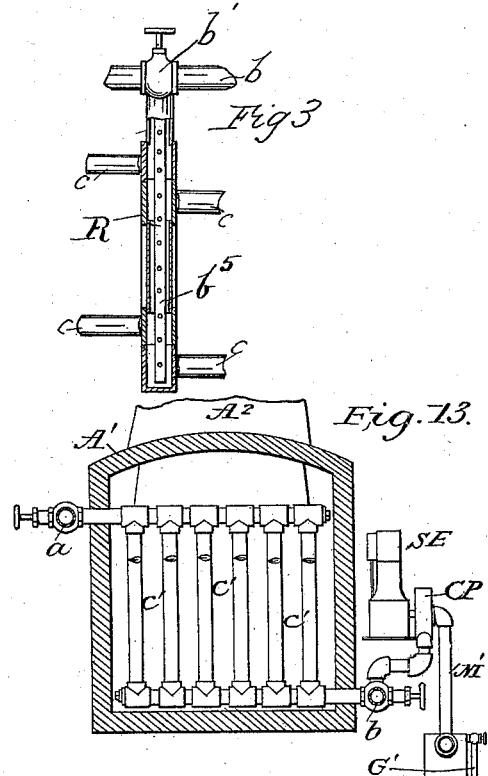
WITNESSES:
INVENTOR
John C. Henderson
BY
James R. Rogers
ATTORNEY.

(No Model.)  5 Sheets—Sheet 2.

J. C. HENDERSON.
HEAT ECONOMIZER.

No. 604,046.  Patented May 17, 1898.

WITNESSES:  INVENTOR
John C. Henderson
BY
James R. Rogers
ATTORNEY.

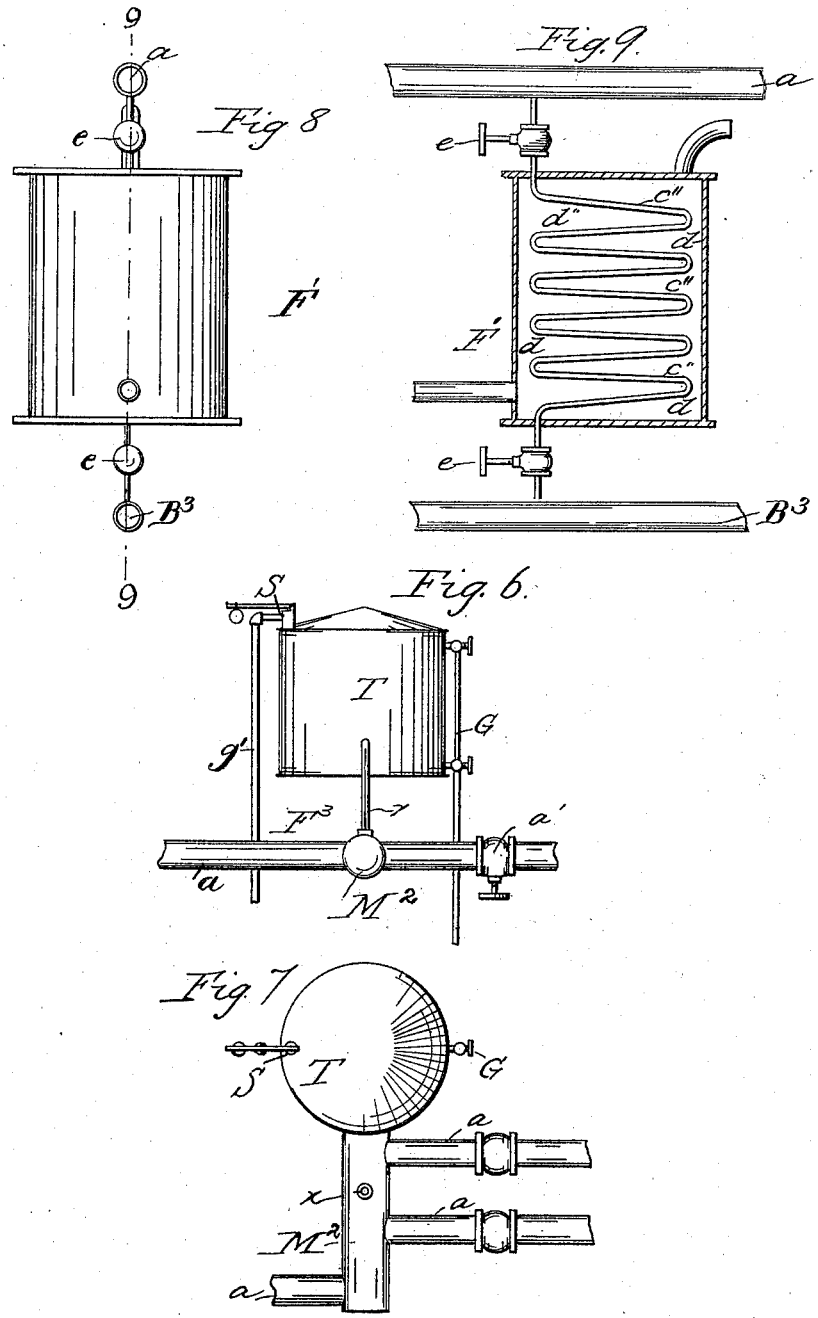

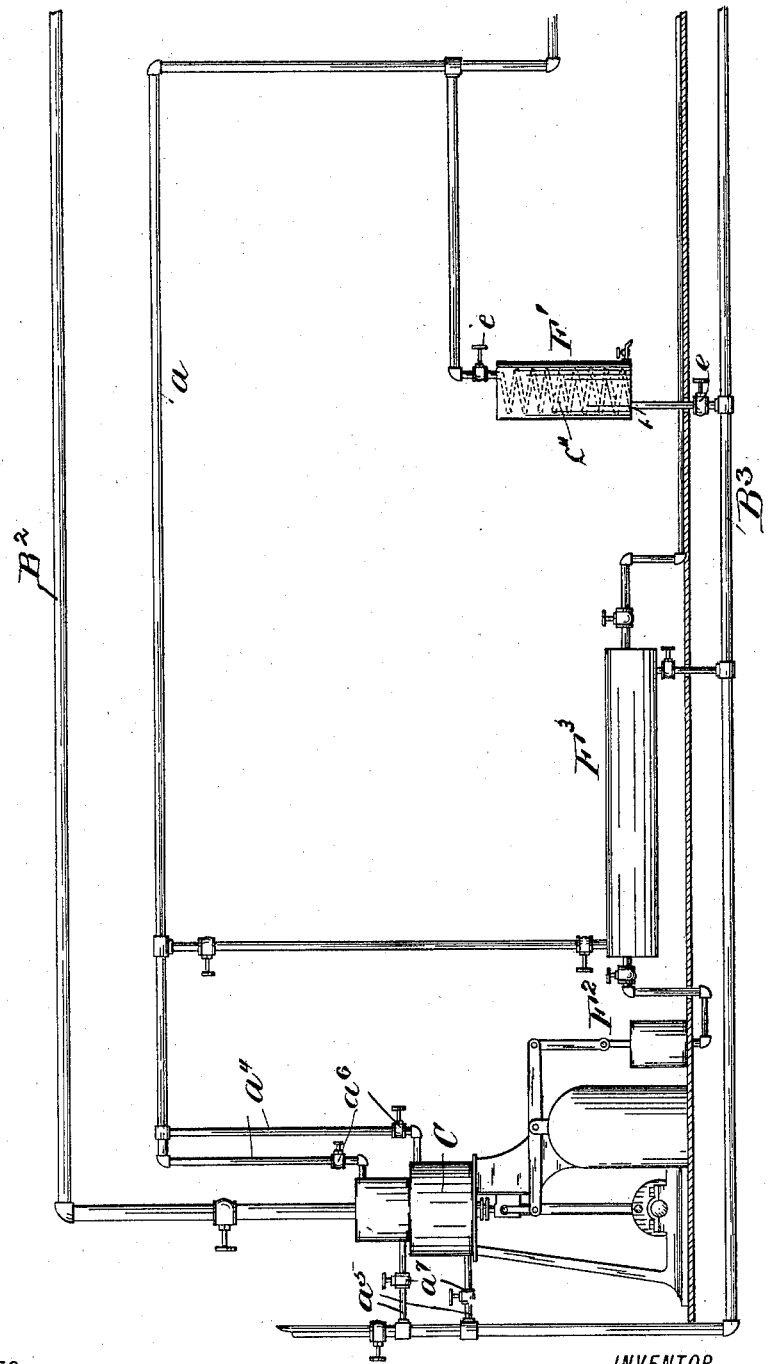

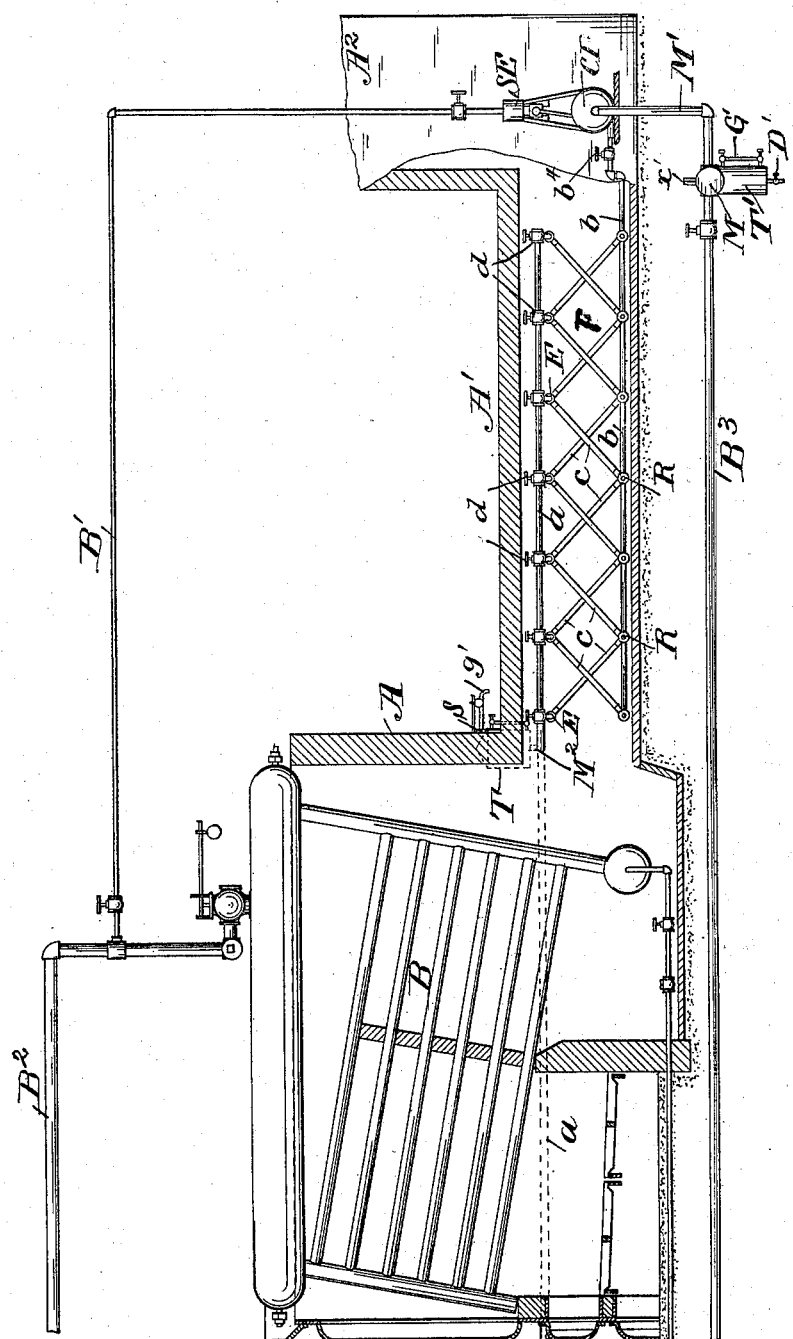

UNITED STATES PATENT OFFICE.

JOHN C. HENDERSON, OF NEW YORK, N. Y.

HEAT-ECONOMIZER.

SPECIFICATION forming part of Letters Patent No. 604,046, dated May 17, 1898.

Application filed June 28, 1895. Serial No. 554,364. (No model.)

*To all whom it may concern:*

Be it known that I, JOHN C. HENDERSON, a citizen of the United States, residing at New York, in the county of New York and State of New York, have invented certain new and useful Improvements in Heat-Economizers; and I do hereby declare the following to be a full, clear, and exact description of the invention, such as will enable others skilled in the art to which it appertains to make and use the same.

My invention relates to improvements in heating systems and the apparatus for carrying said system into effect, wherein a heating medium is caused to circulate through a system or cycle, said medium being heated at one or more suitable points and then conveyed through a main or mains and service or branch pipes therein to be used for any purpose for which it is adapted and through a return-pipe to again be heated and circulated, as before.

The object of my invention is to provide such a system wherein the heat ordinarily lost in the uptake flue, stack, or chimney connected to or in operation with steam-boiler furnaces, generators, furnaces, kilns, exhausts of steam-engines, and the like is taken up, conveyed, and used for heating or reheating feed-water, steam, or vapor in receivers, jackets, coils, or similar apparatus for the heating of gases, air for kilns, evaporators, driers, or for boiling, melting, or, in fact, for any purpose where heat is used without admixture of the heat-containing medium with the material to be heated.

With such objects in view my invention consists of the parts, arrangements, and combination of parts particularly pointed out in the claims.

In order that my invention may be more easily understood, I have shown in the accompanying drawings a practical embodiment thereof, without, however, intending to limit my improvements in their useful applications to the particular arrangement and construction of parts which for the sake of illustration I have therein delineated.

Figure 4:
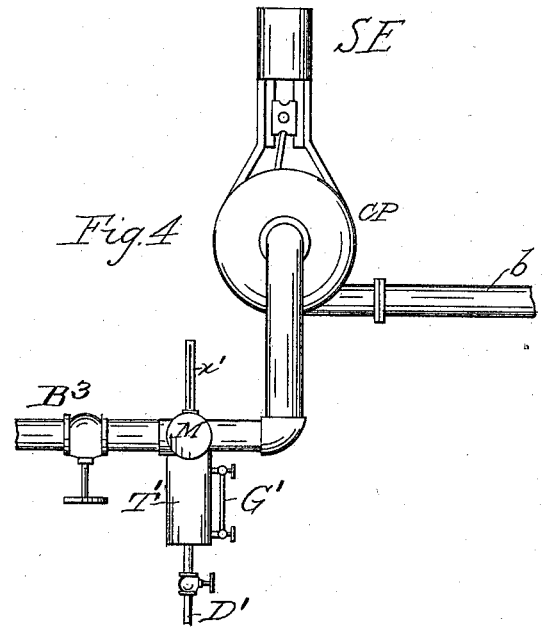
Figure 5:
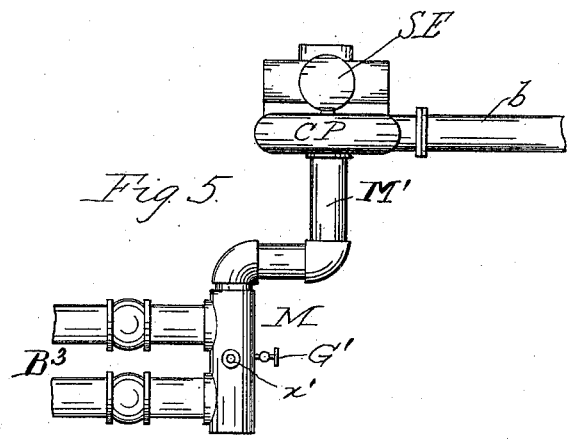

In said drawings, Figure 1 is an elevation of a portion or section of the heater or absorber with its intake and output mains. Fig. 2 is a horizontal section through a portion of the uptake of the furnace, showing in plan the portion of the heater shown in Fig. 1. Fig. 3 is a sectional view of one of the lower manifolds of the heater or absorber. Fig. 4 is a side view showing the intake end of the system. Fig. 5 is a plan view of the intake end shown in Fig. 4. Fig. 6 is a side view of the output end of the system. Fig. 7 is a plan of the output end shown in Fig. 6. Fig. 8 is an elevation showing one of the heaters for feed-water or other material to be heated. Fig. 9 is a sectional view of the heater on line 9 9, Fig. 8. Fig. 10 is a view, partly in section, showing a slightly-modified form of heater. Figs. 11 and 12 are views showing in elevation the entire system and showing the furnace partly in section; and Fig. 13 is a cross-sectional view of the system, taken through the horizontal portion of the smoke-flue and showing the heat-absorber partly broken away.

Referring to the drawings, wherein like letters of reference refer to like parts throughout the several views, A represents a steam-boiler furnace; B, the boiler therein; A', the flue, and $A^2$ the stack thereof.

The above-named parts form no part of my invention and may be of any preferred or usual form.

At some suitable point in the furnace, and preferably in the flue A', as shown, is a heater or absorber F, Figs. 1, 2, and 12, of peculiar and novel construction, to be hereinafter described. Without the furnace, and preferably near the intake end of the absorber, is a centrifugal or other circulating pump C P, which is connected to the heater or absorber by a pipe or pipes $b$ and serves to maintain the required speed of circulation. In this pipe $b$, between the pump and the absorber, is a regulating valve or cock $b^4$ for controlling the supply to the absorber.

S E, Figs. 4, 5, and 12, indicates an engine for operating the pump C P. This engine may conveniently receive its steam-supply from the boiler B through a pipe B'.

$a$ designates the output main or mains, and $B^3$ the intake, which latter is connected by a manifold M. M' is a pipe connecting the manifold with the pump C P. Between these mains $a$ and $B^3$ and connected thereto, respectively, by branches $a^4$ and $a^5$ is the main circulating-pump C, situated at a point remote from the heater or absorber, (see Fig. 11,) operating to draw the heated liquid or other medium from the output-main $a$ and force the cooled or partly-cooled liquid back to the heater through the intake-main $B^3$.

$a^6$ and $a^7$ are valves or cocks in branches $a^4$ and $a^5$, respectively, for regulating the flow to and discharge from the circulating-pump C.

The pump C may also be operated by steam conveyed from the boiler through a pipe $B^2$.

The heater or absorber, which I will now describe, consists of a series of upper and lower manifolds, (lettered E and R, respectively,) which are connected by a series of sections or tubes $c$. From the intake $b$, which lies contiguous to the lower manifolds R and at the point of lowest heat in the flue, leads into each manifold a branch pipe $b^5$, which latter communicates with the manifolds, preferably by means of perforations in the branch pipes $b^5$. The output $a$ lies contiguous to and communicates with each upper manifold by perforated branch pipes $b^6$, similar to the pipes $b^5$, which latter pipes are shown in Fig. 3 of the drawings. The branch pipes $b^5$ and $b^6$ are provided with regulating-valves $b'$ and $d$, respectively, which may be readily operated, as clearly shown in Figs. 2 and 3 of the drawings.

$F'$ in Figs. 8, 9, and 11 indicates a receiver, melting-pan, or the like to be heated. This receiver, of which there may be any number, is situated between the intake and output branches of the system and is provided with a coil $c''$, connected by branch pipes with both sides of the system.

$e\ e$ are valves, one in the branch between the output and the coil and the other between the intake and the coil. The receiver is provided with ingress and egress openings for the material to be heated.

$F^3$ is the feed-water heater, through which feed-water is forced by a pump $F^2$, which I have shown as being operated from a steam-pump C. The feed-water heater may have therein a coil similar to that shown in the receiver $F'$, which likewise has communication with both sides of the system.

In Fig. 10 I have shown a slightly-modified form of heater, in which $d'''$ indicates a jacket which, like the coil $c''$, is connected by pipes provided with valves $t\ t$ to both sides of the system.

$d^4$ is a pan or receptacle within the jacket, adapted to receive the material to be heated.

For the circulating heating medium I employ any suitable material having a high boiling-point—such as linseed, whale, or petroleum oil. When petroleum is used, it is found necessary to provide means adapted to permit the escape of light gases which are generated in the system. For this purpose I make use of a tank T, situated, preferably, near the output end on the absorber and connected to the output of the latter by the manifold $M^2$ and branch conduits or pipes. (See Figs. 6, 7, and 12.)

S is a relief-valve on the tank T, from which the escaping gases are conducted by a pipe $g'$.

G is a gage on the tank to indicate the height of oil, and $x$ is a thermometer placed at a suitable point, as on the manifold $M^2$, to indicate the temperature of the oil.

On the intake branch of the system is a drip and water tank $T'$ to allow any water to be drawn off that may have accumulated therein when oil is used as the heat-conveying medium.

$D'$ is a drawing-off cock or nozzle.

$G'$ is a gage on the tank $T'$, and $x'$ is a thermometer. The tank is preferably placed on the manifold M.

The circulation is as follows: From the pump C the heating medium is forced through the main or mains $B^3$ to the circulating-pump C P, from which it is carried by the intake $b$, which is situated, as stated, at a point of low heat in the flue A, to the branch pipes $b^5$. Through the perforations in these pipes it escapes into the lower manifolds R of the absorber, thence up through the tubes $c$ into the upper manifold E, situated at the point of highest heat in the uptake, from whence it flows through the perforated branch pipes $b^6$ into the output $a$, by which it is conveyed in a highly-heated state back through the heaters and receivers to the pump C, to again be forced to the absorber to be reheated.

What I claim is—

1. In a heating system, the combination with the source of heat, the absorber or heater, having manifolds, upper and lower, arranged parallel with each other, and within the flue of the uptake, and communicating with each other, adapted to be acted on by the said heat, the circulating system, substantially as herein shown and described, and connected with said heater, for carrying a heating medium, as oil, and pumps for circulating the said medium through the system, and through the heater or absorber, as herein set forth.

2. In a heating system, the combination with the source of heat, the absorber or heater, provided with series of upper and lower manifolds, located and arranged within the flue of the uptake, in different planes, but parallel with each other, connected together, and communicating with each other, and adapted to be acted on by the said heat, the circulating system connected to, and communicating therewith, and adapted to keep in a continuous circulation a heating medium, such as oil, the intake of said heater or absorber, situated at the point of lowest heat, and the output at the point of highest heat, substantially as herein shown and described.

3. In a heating system, the combination with a furnace, of the uptake thereof, of the heater or absorber, consisting of the two series of upper and lower manifolds, connected together, and communicating with each other, by the series of tubes or sections, the series of tubes, c, having one end of each of said tubes opening into the upper manifolds, and the other end thereof, opening into the lower manifold, the circulating system, adapted to carry on continuous cycles of a circulating medium, through the said system and absorber, and means for circulating said medium, substantially as herein shown and described.

4. In a heating system, the combination of the heater or absorber, provided with two manifolds connected together, and communicating with each other, the series of sections or tubes, c, each of said manifolds having perforated branch pipes, located therein, the circulating system, adapted to keep in continuous circulation a heating medium, the receiver or melting-pan, pipes connected to, and communicating with, both sides of the said system, for conducting the heating medium to and from the receiver-jackets, reheaters, or melting-pans, substantially as herein shown and described.

5. In a heating system the combination of the intake and output, of the heater or absorber, comprising two series of manifolds, an upper and a lower series, located and arranged within the flue of an uptake, in different planes, one above the other, and connected together and communicating with each other by means of a series of tubes, one or more of said manifolds connected to and communicating with the intake, and one or more of said manifolds connected to and communicating with the output, substantially as herein shown and described.

6. The combination with the intake and the output, of a heater or absorber, consisting of two series of manifolds, tubes connecting together, and forming communication between said series of manifolds, the plurality of inclosed perforated pipes, connecting together and forming communication between one of said series of manifolds, and the intake, and valves for said pipes, substantially as herein shown and described.

7. In a heating system, the combination of the intake and the output, the heater or absorber, substantially as herein shown and described, the circulating system, for carrying on continuous cycles of a heating medium, such as oil, the gas and steam relief, upon the output, and the drip and water tank, upon the intake, as herein set forth.

8. In a heating system, the combination with the source of heat, of the absorber or heater, having two series of manifolds, an upper and lower connected together, and communicating with each other, the series of sections or tubes, c, communicating with the said manifolds respectively and each of said manifolds, provided with perforated branch pipes, and regulating-valves, the circulating system connected therewith, and adapted to keep in a continuous circulation a heating medium, such as oil, the intake of said heater or absorber, situated at the point of lowest heat, and the output at the point of highest heat, substantially as herein shown and described.

In testimony whereof I affix my signature in presence of two witnesses.

JOHN C. HENDERSON.

Witnesses:
WILLIAM MOLLOY,
J. ARTHUR GIVENS.